US011082309B2

(12) United States Patent
Boucadair et al.

(10) Patent No.: US 11,082,309 B2
(45) Date of Patent: Aug. 3, 2021

(54) DYNAMIC AND INTERACTIVE CONTROL OF A RESIDENTIAL GATEWAY CONNECTED TO A COMMUNICATION NETWORK

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/345,005

(22) PCT Filed: Oct. 24, 2017

(86) PCT No.: PCT/FR2017/052935
§ 371 (c)(1),
(2) Date: Apr. 25, 2019

(87) PCT Pub. No.: WO2018/078279
PCT Pub. Date: May 3, 2018

(65) Prior Publication Data
US 2019/0273669 A1 Sep. 5, 2019

(30) Foreign Application Priority Data
Oct. 26, 2016 (FR) ...................... 1660397

(51) Int. Cl.
*G06F 15/173* (2006.01)
*H04L 12/26* (2006.01)
(Continued)

(52) U.S. Cl.
CPC ........ *H04L 43/028* (2013.01); *H04L 41/0816* (2013.01); *H04L 63/02* (2013.01); *H04L 63/20* (2013.01)

(58) Field of Classification Search
CPC .......................... H04L 43/028; H04L 41/0816
See application file for complete search history.

(56) References Cited

U.S. PATENT DOCUMENTS 8,233,943 B1 * 7/2012 Othmer ............. H04M 1/72563
455/567
2003/0018794 A1 * 1/2003 Zhang ................. H04L 65/1026
709/231
(Continued)

FOREIGN PATENT DOCUMENTS

EP 2485456 A1 8/2012
WO 03039053 A2 5/2003
(Continued)

OTHER PUBLICATIONS

International Search Report dated Dec. 13, 2017 for corresponding International Application No. PCT/FR2017/052935, filed Oct. 24, 2017.
(Continued)

*Primary Examiner* — Padma Mundur
(74) *Attorney, Agent, or Firm* — David D. Brush; Westman, Champlin & Koehler, P.A.

(57) ABSTRACT

A method of dynamic and interactive control of a residential gateway connected to a communication network. An entity located in the gateway and/or in the communication network implements the following steps: filtering incoming and outgoing streams entering and exiting the residential gateway so as to detect a stream compliant with a filtering template; in case of a stream compliant with the filtering template, triggering a sending of a notification to at least one first contact address associated with the gateway; and waiting for a decision sent from a second contact address associated with the gateway subsequent to the sending of the notification before actuating a corrective measure of a configuration of the residential gateway.

10 Claims, 5 Drawing Sheets

Figure 1:
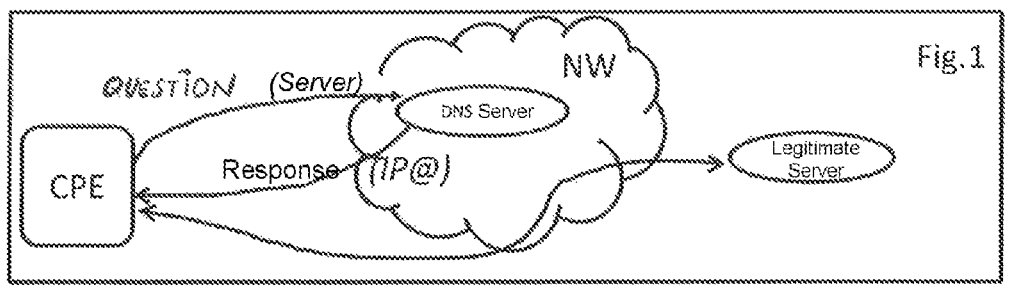

(51) Int. Cl.
*H04L 12/24* (2006.01)
*H04L 29/06* (2006.01)

(56) References Cited

U.S. PATENT DOCUMENTS

| | | | |
|---|---|---|---|
| 2008/0031436 A1* | 2/2008 | Der | H04M 3/465 379/201.02 |
| 2010/0241556 A1* | 9/2010 | Reinheimer | G06Q 40/00 705/38 |
| 2013/0060942 A1* | 3/2013 | Ansari | G10L 15/22 709/225 |
| 2015/0019662 A1* | 1/2015 | O'Kane | G06Q 10/107 709/206 |
| 2017/0118091 A1* | 4/2017 | Townend | H04L 41/5067 |

FOREIGN PATENT DOCUMENTS

| | | | |
|---|---|---|---|
| WO | 2005062545 A1 | 7/2005 | |
| WO | 2012166194 A1 | 12/2012 | |

OTHER PUBLICATIONS

Written Opinion of the International Searching Authority dated Dec. 13, 2017 for corresponding International Application No. PCT/FR2017/052935, filed Oct. 24, 2017.

International Preliminary Report on Patentability and English translation of the Written Opinion dated Apr. 30, 2019 for corresponding International Application No. PCT/FR2017/052935, filed Oct. 24, 2017.

* cited by examiner

DYNAMIC AND INTERACTIVE CONTROL OF A RESIDENTIAL GATEWAY CONNECTED TO A COMMUNICATION NETWORK

CROSS-REFERENCE TO RELATED APPLICATIONS

This Application is a Section 371 National Stage Application of International Application No. PCT/FR2017/052935, filed Oct. 24, 2017, which is incorporated by reference in its entirety and published as WO 2018/078279 A1 on May 3, 2018, not in English.

FIELD OF THE INVENTION

The field of the invention is that of telecommunications and more particularly that of preserving the continuity of communication services in case of events (attacks) of such a nature as to affect a customer's access to a telecommunication network and to the services to which the customer has subscribed from a residential gateway.

The invention therefore finds applications in any communication network implementing at least one (domestic or business) residential gateway.

PRIOR ART

The IP ("Internet Protocol") network is the universal support for a multitude of services and applications.

To access these services or applications, a residential gateway, also called a "box", HG for "Home Gateway" or CPE for "Customer Premises Equipment", is conventionally installed at a user's residence. Stated otherwise, a residential gateway serves as interface between the user's local network and an operator's IP network. It is therefore the concentrator element which is traversed by all the connections, the traffic characteristic of the various services subscribed to by the user, and which also supports a set of applications provided by a telecommunications operator.

For example, a residential gateway allows a user to access multiple IP services allowing simultaneous access to the Internet, to video contents (including the broadcasting of televised programs) and to voice services (telephony over IP). The corresponding commercial offering is conventionally termed Triple Play.

As regards connectivity, the residential gateway is hooked up on one side to the operator's network and provides, customer side, a set of varied interfaces: wireless interface (e.g. WLAN, Bluetooth (trademark), etc.), RJ11 socket for telephony, RJ45 sockets for digital television and computers, USB (Universal Serial Bus) sockets, Ethernet port.

In addition to the provision of access to the whole set of services (data, video, voice) subscribed to by the customer, the residential gateway is also involved in the management of the functions that it supports (for example management of the NAT (Network Address Translator) address translation rules, of the filters of the firewall, etc.).

As regards application packages, the residential gateway integrates the software used for gateway maintenance operations.

In the last few years, residential gateways have become the target of attacks exploiting security vulnerabilities.

Certain gateways are infested by malicious software and, unbeknown to customers/users, are used to set up large-scale DDoS (Distributed Denial of Service) attacks. The involvement of gateways in service denial attacks impacts negatively on the reputation of the blocks of IP addresses of the access provider, that is to say that these addresses have a poor reputation when suspicious activity related to their use is detected.

Hence, certain security vulnerabilities may be exploited for the control of connected objects (lighting system, for example).

The access provider does not always have the capability of quelling all these various attacks and this may cause an increase in calls to the after-sales service in case of observed malfunction. These attacks may then give rise to a degradation of the quality of experience and a degradation of the brand image.

Given that the gateway is a compulsory point of transit for the entirety of the traffic sent out by the or destined for the users, attacks may be conducted on this equipment to intercept sensitive data such as bank data. An emblematic attack consists in modifying the configuration of the gateway's DNS (Domain Name System) server(s).

By way of example illustrated by FIG. 1, let us consider a gateway CPE whose configuration is not corrupted, that is to say that it advises in particular a list of "legitimate" DNS servers. Typically, when a terminal connected to the gateway CPE wishes to reach a server identified by a domain name, a DNS resolution request is relayed by the gateway CPE to at least one of these preconfigured DNS servers. A connection is then established by using the IP address or addresses returned by the DNS server. All the elements which intervene between the customer network and the server for forwarding the data are trusted elements. Assuming that an attacker wishes to capture a user's traffic and thus intercept some of his data, he can carry out the attack illustrated by FIG. 2. This attack consists in providing an IP address of a server used by the attacker instead of an IP address of the content server which the customer initially wished to access. Accordingly, it suffices to modify the configuration of the gateway CPE in order to send the DNS requests to a DNS server of the attacker. All the connections that require DNS exchanges are thus intercepted by the attacker's DNS server which, consequently, can redirect the customer's traffic to dedicated servers which emulate certain sites (for example, a bank account).

A very great majority of customers are not in the habit of checking the identity of the DNS servers (configured in the CPE) that they invoke each time they wish to access a server located somewhere on the Internet. Worse, these customers do not even know the role and a fortiori the manner of operation of the DNS servers which contribute to the provision of the IP transfer service.

Figure 3:
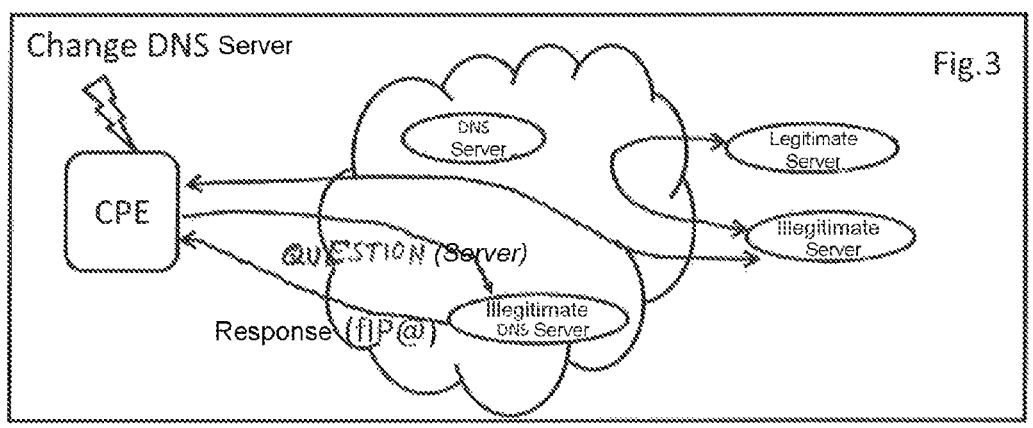

The attacker may also decide to redirect, after interception, the user's requests to the "legitimate" server so as to prevent the customer from noticing the attack as illustrated by FIG. 3.

The installation and management of the residential gateway for access to Internet access services as well as to telephone and television services in particular are conventionally performed by the user since the residential gateway is installed at the user's residence.

However, users often see this gateway as a black box of whose capabilities and manner of operation they are ignorant, despite daily use. Thus, the gateway's administration interface, often accessible via the HTTP (HyperText Transfer Protocol) protocol, is not well known to most users. Mass-market customers do not always have the skills or sufficient knowledge to be able to directly manage the functions offered via a management interface of the residential gateway and thus to configure certain parameters.

Furthermore, the current modes of management of the gateway assume that the customer is connected directly to the gateway. A need therefore exists for a new technique making it possible to combat attacks which impact the manner of operation of a residential gateway.

SUMMARY

The subject of the invention is a method of dynamic and interactive control of a residential gateway connected to a communication network. The method comprises:
  filtering of the incoming and outgoing streams entering and exiting the residential gateway so as to detect a stream compliant with a filtering template,
  in case of a stream compliant with the filtering template, triggering a sending of at least one notification to at least one first contact address associated with the gateway and
  waiting for a decision sent from a second contact address associated with the gateway subsequent to the sending of the notification before actuating a corrective measure in respect of a configuration of the residential gateway.

The filtering can be configured in the factory or during installation of the residential gateway and optionally modified subsequently either remotely, or from a local interface of the gateway, or from a user account. The filtering of the incoming and outgoing streams can be performed locally by the gateway and/or in a remote manner by one or more entities of the communication network. In particular, the filtering is performed by an item of equipment for accessing the network (for example a BRAS) of the Internet network access provider, it being possible for this provider to be the one that exploits and operates the residential gateway. The configuration associated with the filtering comprises the identification of at least one contact address (the first address) to which the notifications are transmitted. This contact address must form part of the contact addresses declared by a known customer of the user account. Thus, the contact address can be an MSISDN (Mobile Station International Subscriber Directory Number) number, a telephone number associated with a fixed line, a session recording address (AoR (Address of Record) Session Initiation Protocol (SIP)) such as a URI (Uniform Resource Identifier) resource identifier.

The configuration of the filtering template can consist in listing events considered to be suspicious and corresponding to certain traffic streams such as: an update of the software of the residential gateway, a request for modification of a DNS server, of a dynDNS DNS dynamic server or of an NTP (Network Time Protocol) server, an activation of an FTP (File Transfer Protocol) server, a modification of a rule of the firewall embedded in the residential gateway, the attachment of a new terminal to the gateway, traffic that is not compliant with a nominal profile (for example the sending of UDP (User Datagram Protocol) packets from the Internet network to a port known to be suspicious (port "0", port "443", etc.), the sending of messages to an address outside of the local network from objects connected to a network, etc.). The configuration can thus correspond to an "abnormal" traffic profile. One of the objectives of the filtering is to detect illegitimate redirection of traffic.

Filtering thus makes it possible to detect a use of the residential gateway which is a priori suspicious.

When the incoming or outgoing streams exhibit a particularity which corresponds to the filtering template such as configured, there is generation of a notification destined for the declared contact address. If this address is an MSISDN number, the notification can be transmitted in the case where an urgent intervention is desirable via a telephone call according to a voice over network mode of transmission of LTE (Long Term Evolution) type with a so-called Voice over IP (VoIP) coding. In other cases, the notification can be transmitted via the SMS/MMS (Short Message Service/Multimedia Messaging Service) service. This mode of notification by SMS/MMS has the advantage of benefiting from the recognized reliability of the SMS service and its very widespread use. Furthermore, such a mode allows deployment with a fixed network infrastructure optionally extended to one or more mobile access networks. According to other modes, the notification consists in sending a SIMPLE (SIP for Instant Messaging and Presence Leveraging Extensions) message.

The notification meets a certain format. According to one embodiment, the format comprises a "caption of the detected event" with optionally a "risk level", a "yes/no" decision choice in respect of an action, a list of actions "confirm/deny/block/authorize/ . . . /disconnection or not of an object connected to the gateway" in conjunction with the detected event.

The recipient must return a decision. The recipient is either the customer via a contact address which corresponds for example to a telephone number or an entity located in the gateway or in one or more nodes of the network. This entity is then configured with the user's preferences relating more particularly to his Internet connections, the websites that they consult.

Optionally, the method repeats the sending of the notification until a decision is received.

Any corrective measure ordered by the method is conditioned upon the receipt of a decision sent from a second contact address associated with the gateway, optionally identical to the first address.

Having regard in particular to the traffic forwarding and routing functions, the traffic classification and scheduling functions which may be deployed in various ways, the user's participation in the decision taking regarding the abnormal character detected makes it possible to increase the effectiveness of the distinction ultimately made between legitimate traffic and illegitimate traffic. Consequently the corrective measure is thus used more wisely.

Furthermore the user's participation makes it possible to sensitize him in a transparent manner to security vulnerabilities and to induce him to apply security measures. This tends to strengthen the robustness of the operator's network and of the reputation of the IP addresses which are associated therewith. The involvement of the user makes it possible to minimize the risk of a unilateral decision of the operator to launch a corrective measure affecting the manner of operation of a service whilst this manner of operation was satisfactory for the user.

The subject of the invention is further a system comprising a communication network and a residential gateway connected to the network for the dynamic and interactive control of the gateway. The system is such that the gateway comprises filters configured according to a filtering template to filter incoming and outgoing streams entering and exiting the residential gateway. In case of a stream compliant with the filtering template, the gateway is adapted to trigger a sending of a notification to a first contact address associated with the gateway and to wait for a decision sent from a second contact address associated with the gateway subsequent to the transmission of the notification before actuating a corrective measure in respect of a configuration of the residential gateway.

The subject of the invention is further a communication system for the dynamic and interactive control of a residential gateway. The system comprises a communication network comprising a server, the residential gateway being connected to the network. The system is such that the server comprises filters configured according to a filtering template to filter incoming and outgoing streams entering and exiting the residential gateway. In case of a stream compliant with the filtering template, the server is adapted to trigger the sending of a first notification to a first contact address associated with the gateway and to wait for a decision sent from a second contact address associated with the gateway subsequent to the transmission of the first notification before taking a corrective measure intended to modify the configuration of the residential gateway.

The subject of the invention is further a residential gateway intended to be connected to a communication network. The gateway comprises:
  configurable filters to filter incoming streams and outgoing streams entering and exiting the gateway, means for sending a notification if at least one stream corresponds to at least one of the filters,
  means for receiving an action message describing at least one corrective action to be performed by said residential gateway and
  means for executing the corrective action.

According to one embodiment of the invention, the sending of a notification is performed to several contact addresses associated with the gateway.

According to a first mode the sending of notifications to several contact addresses is performed in a sequential manner. When no decision has been received from the first contact address in a determined time span since the sending of the notification or after a certain number of sends without response, the method sends the notification to a second contact address. According to this mode, the second contact address may be different from the first contact address and the decision is awaited from the second contact address. Optionally, the method repeats as necessary the sending of notifications to a contact address until a decision is received.

According to a second mode, the sending of notifications to several contact addresses is performed in parallel. According to a particularly simple realization, the first decision received from one of the contact addresses actuates the corrective measure in respect of the configuration of the residential gateway.

According to one embodiment of the invention, the wait is timed and after a determined time the method comprises:
  actuating a corrective measure in respect of a configuration of the residential gateway as a function of the compliant stream detected.

According to this mode, the method takes a decision after the end of the timing period. Thus, in the absence of return from the contact address within the time determined, the method decides on a corrective action when a compliant stream has been detected. For example, the detection of ICMPv6 (Internet Control Message Protocol, version 6) messages sent out on any port number between 5 and 99 in the incoming or outgoing streams leads to a decision to update of the configuration of the firewall of the residential gateway so that this firewall filters these messages with the least possible delay.

According to one embodiment of the invention, the method further comprises: activating or deactivating the sending of the notification under control of an input of an authenticated user.

The customer can thus activate or deactivate any action of notification and of correction even if the filtering is active. To avoid a fraudulent activation or deactivation, only the authenticated customer has access to this activation and deactivation function.

According to one embodiment of the invention, the configuration of the filtering and the sending of the notifications are implemented with real-time commands.

These commands belong for example to USSD (Unstructured Supplementary Service Data) technology. This type of technology has the advantage of circumventing a direct connection to the residential gateway. Furthermore, they allow an implementation of the method with a short reaction time.

According to one embodiment of the invention, the sending of a notification is performed with one or more so-called SMS or MMS short messages.

This mode does not impose any noticeable change of the user's habits having regard to the popularity of the SMS/MMS service.

A residential gateway according to the invention is in particular suitable for implementing the method such as described previously. Thus, such a gateway can exhibit the various characteristics relating to the method according to the invention, these characteristics being able to be combined or taken in isolation.

The subject of the invention is further one or more computer programs comprising instructions for the implementation of at least one method such as described hereinabove, when this or these programs are executed by a processor.

The subject of the invention is further one or more irremovable, or partially or totally removable, information media readable by a computer and comprising instructions of one or more computer programs for the execution of the steps of at least one method such as described hereinabove.

The methods according to the invention can therefore be implemented in diverse ways, in particular in hard-wired form and/or in software form.

LIST OF FIGURES

Figure 2:
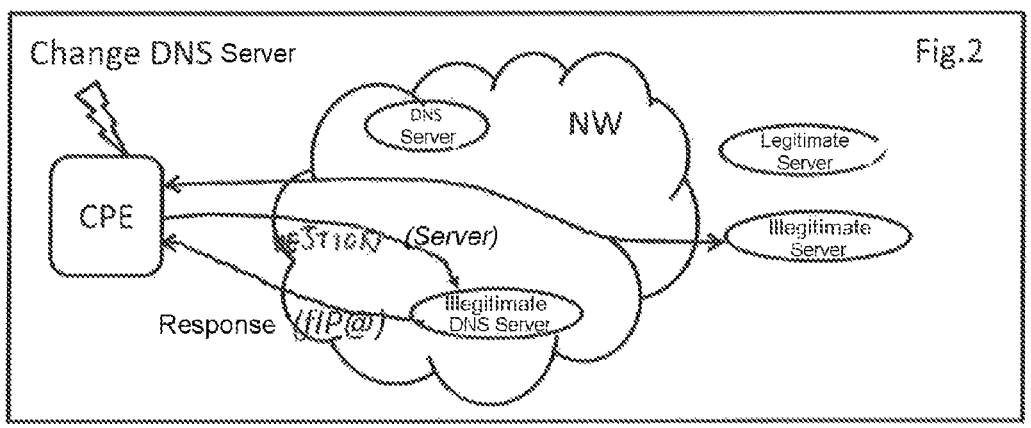
Figure 4:
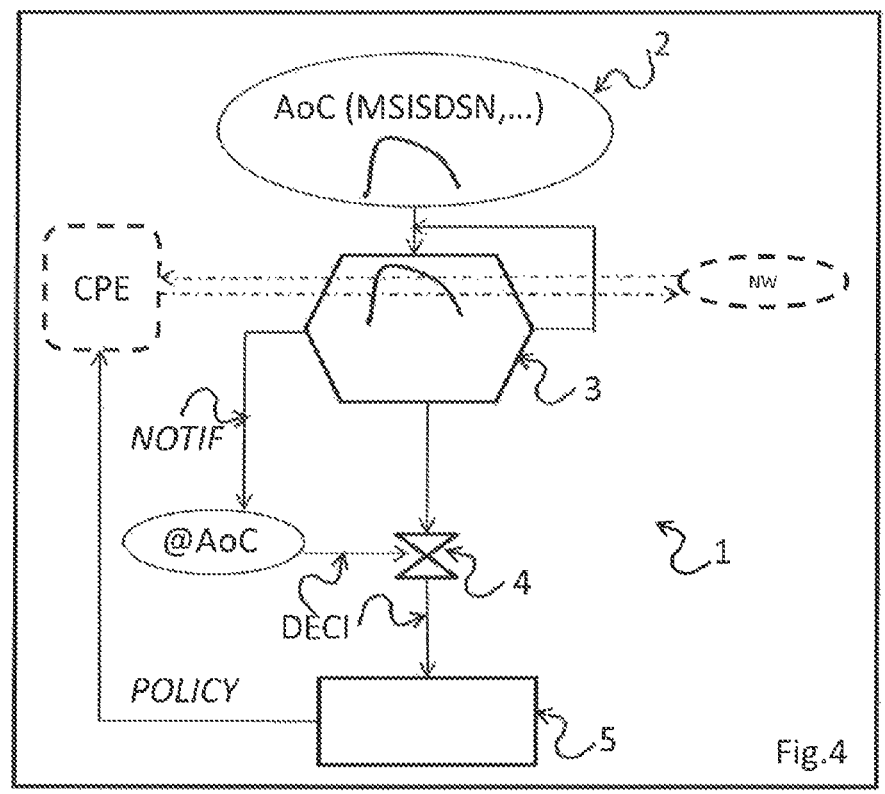
Figure 11:
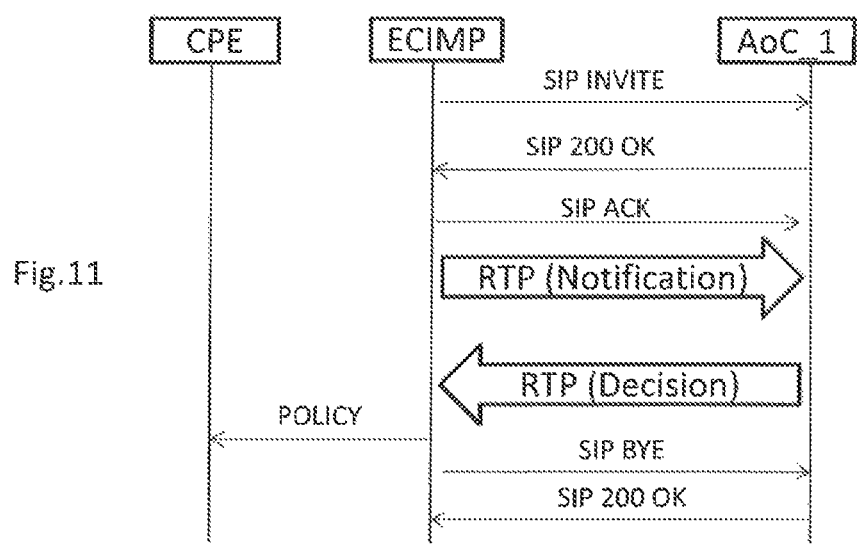
Figure 5:
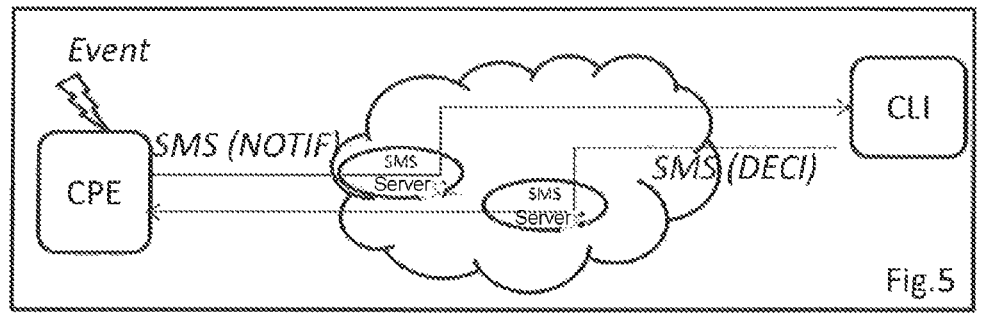
Figure 6:
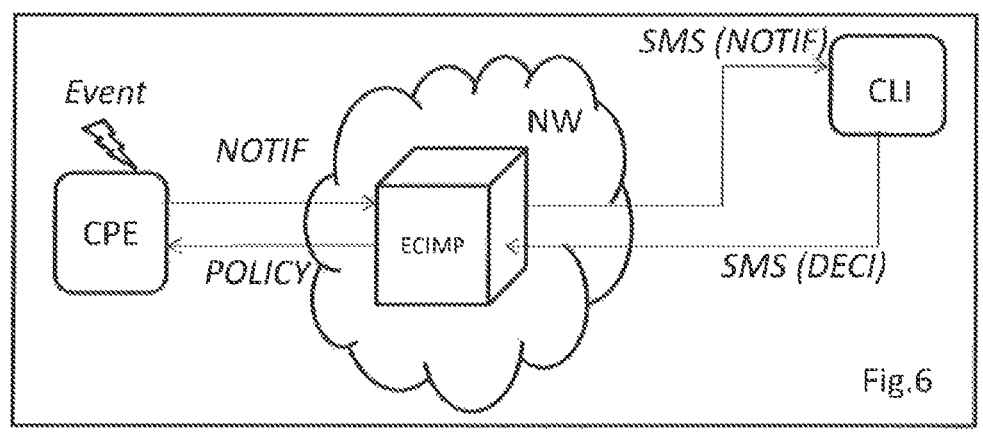
Figure 7:
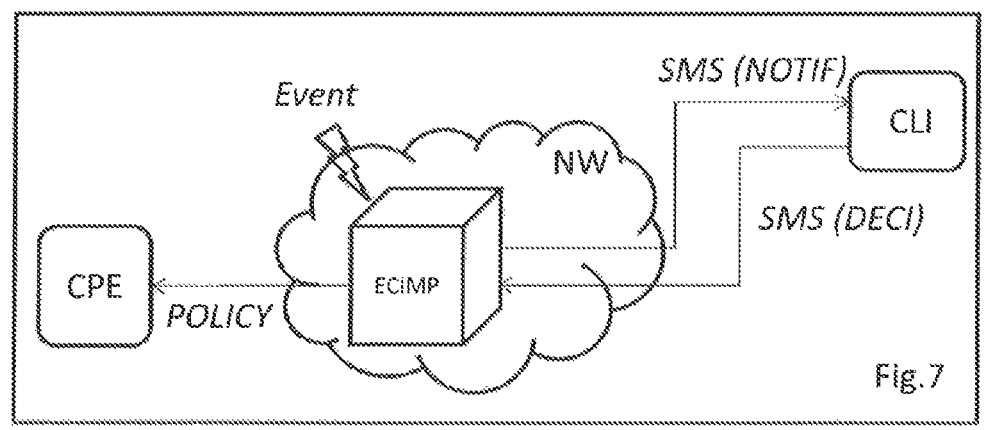
Figure 8:
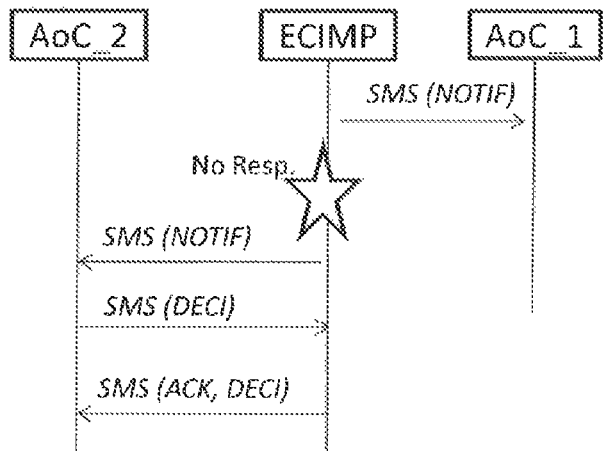
Figure 9:
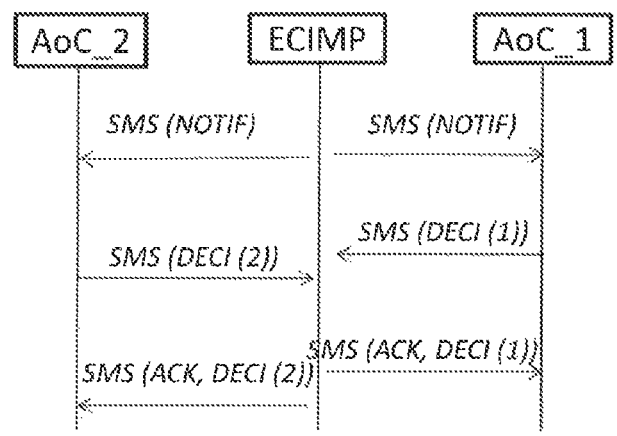
Figure 10:
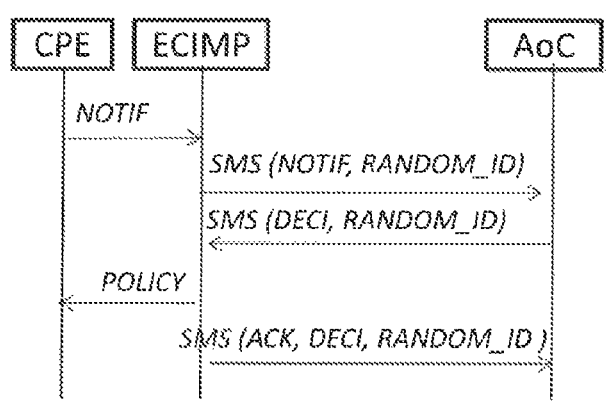
Figure 12:
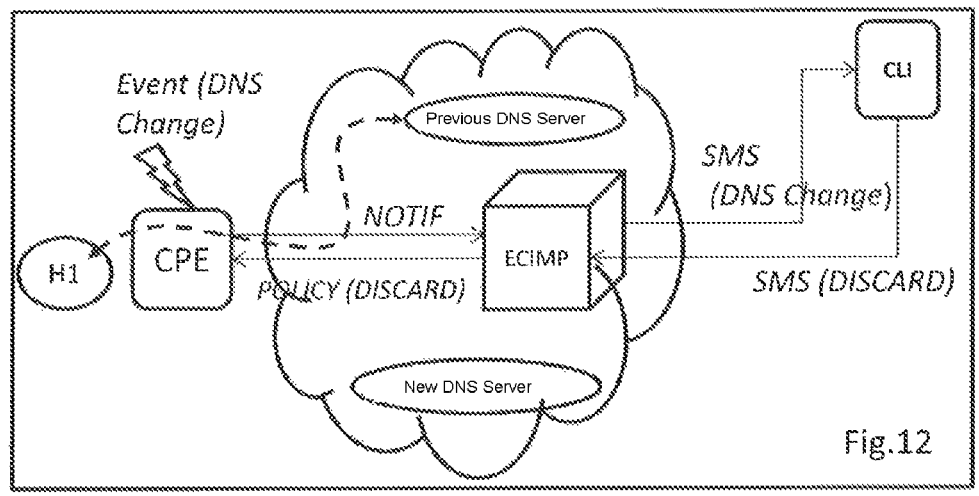
Figure 13:
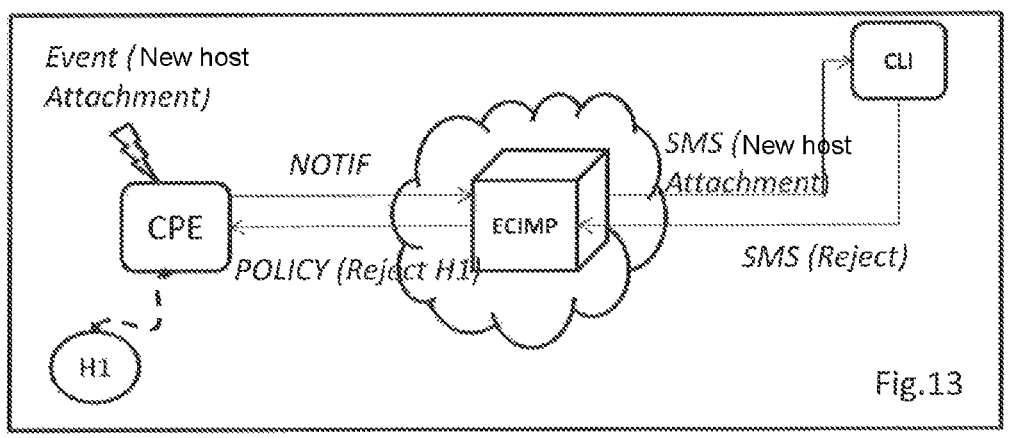
Figure 14:
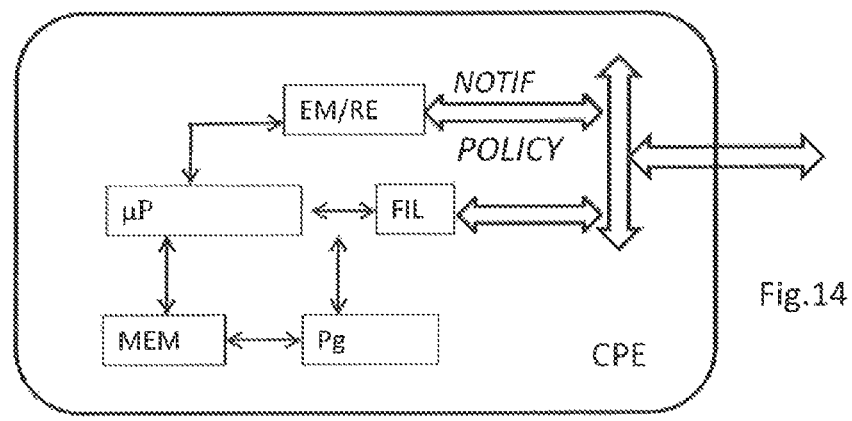

Other characteristics and advantages of the invention will become more clearly apparent on reading the following description of particular embodiments given by way of simple illustrative and nonlimiting examples and the appended drawings, among which:

FIG. 1 is a diagram illustrating an uncorrupted residential gateway connected to a communication network advising legitimate servers, FIG. 2 is a diagram illustrating an attack on the gateway of FIG. 1 aimed at capturing the traffic of a user of the gateway, FIG. 3 is a diagram illustrating the redirection of the requests of the user to a "legitimate" server subsequent to the attack, illustrated by FIG. 2, on the gateway of FIG. 1, aimed at capturing the traffic of a user of the gateway, FIG. 4 is a flowchart of the main steps of a method according to the invention, FIG. 5 is a diagram illustrating a particular implementation of the method according to the invention using SMS (Short Message Service) technology and according to which the ECIMP (Enhanced CPE Interactive Management Platform) platform is embedded in the gateway, FIG. 6 is a diagram illustrating a particular implementation of the invention according to which the ECIMP platform is embedded in servers of the network operator with detection of a suspicious stream by the gateway, FIG. 7 is a diagram illustrating the detection of a suspicious stream by the ECIMP platform in the case of an implementation according to which the ECIMP platform is embedded in servers of the operator's network, FIG. 8 is a diagram illustrating an embodiment of the method according to which the ECIMP platform notifies another contact address sequentially if no return has been received from the previous contact address, FIG. 9 is a diagram illustrating an embodiment of the method according to which the ECIMP platform notifies several contact addresses in parallel, FIG. 10 is a diagram illustrating an embodiment of the method according to which a security key must be used in the exchanges with the customer, FIG. 11 is a diagram illustrating an embodiment of the method according to which the exchange with the customer is established by means of a media communication in synchronous mode, FIG. 12 is a diagram illustrating an example according to which the method makes it possible to detect an attack aimed at diverting the streams of a customer and makes it possible to launch a corrective measure by the gateway in reply to this attack, FIG. 13 is a diagram illustrating an example according to which the method makes it possible to detect an attempted intrusion from a customer terminal and makes it possible to launch a corrective measure by the gateway in reply consisting for example in disconnecting the intruder terminal, FIG. 14 is a diagram of the simplified structure of a residential gateway according to the invention suitable for implementing a method of control of the gateway according to the invention.

DESCRIPTION OF EMBODIMENTS OF THE INVENTION

The general principle of the invention relies on the prompting of the user before any corrective measure in respect of his residential gateway subsequent, for example, to the detection of a stream related to his gateway compliant with a filtering template.

The main steps of the invention are illustrated by the diagram of FIG. 4. According to the method 1, the customer must declare 2 at least one contact address (identifier) AoC (Address of Contact). The customer only or the customer and the operator of the residential gateway configure 2 a filtering template in respect of the streams of the gateway. The gateway or the gateway and the network filter 3 the streams of the gateway CPE. If an event/a stream compliant with the template is detected, then a notification NOTIF is addressed to the contact address AoC. The method places itself on standby waiting 4 for a decision DECI of the customer before launching 5 a corrective measure POLICY in respect of the gateway CPE.

The filtering intervenes both on the incoming streams and on the outgoing streams entering and exiting the gateway. The user intervenes either in real time ("live") or in an anticipated manner by having advised his preferences (or profile) so that a decision regarding the action to be undertaken can be taken almost immediately after the prompting of the customer subsequent to the detection of an a priori suspicious stream.

To advise his preferences the user has access to a notification and decision taking interface. This interface can be the gateway's management interface, which is generally a local web server or a dedicated interface. This dedicated interface is accessible via a trusted network or relayed by the connectivity provider (i.e. access provider). This interface is simple, does not require any particular technical knowledge or any dedicated terminal in order to hook up to the gateway.

The invention is associated with a so-called ECIMP (Enhanced CPE Interactive Management Platform) platform, that is to say a logical entity, which is functionally responsible for the receipt of the notifications sent by the CPE and the response to these notifications, as well as the decision-taking process. This platform does not call upon any particular apparatus structure, or upon any particular network architecture. The ECIMP entity can be decomposed into several elementary functions which can be hosted by one and the same node of the network or be distributed over several nodes of the network or virtualized within a "cloud" infrastructure.

The invention applies to all deployment models relying on a residential gateway; from the model customarily implemented by operators according to which functions L3 are embedded in the gateway to any alternative model which consists in relieving the gateway of certain functions L3 and hosting them in the operator's network. No assumption is made regarding the various technologies implemented by the gateway nor regarding the way of implementing and of activating characteristic functions of the gateway (e.g. the traffic forwarding and routing functions, the traffic classification and scheduling functions, etc.), whether these functions are embedded physically in the gateway deployed on the customer site or virtualized within a "cloud" infrastructure.

The invention is described in greater detail hereinafter.

According to one embodiment illustrated by FIG. 5, the implementation relies on SMS (Short Message Service)/MMS (Multimedia Messaging Service) technology. The SMS service is a service deemed to be reliable and broadly democratized. It does not impose any constraint on the terminals used by customers or on the habits of usage of applications of these customers. The SMS service can moreover be deployed on a fixed or mobile infrastructure. Thus, no particular assumption is made regarding the nature of the network infrastructure (fixed or mobile) used by the invention, or regarding the nature of the access infrastructure to which the gateway is connected (copper, fiber, mobile).

The declaration of contact address(es) must be reliable. The contact address must be configured by the customer. A contact address points at a unique identifier so as to be able to prompt in real time a customer or the preferences that he has recorded. One or more contact addresses (AoC) can be configured by the customer, typically the MSISDN (Mobile Station ISDN Number) numbers or addresses defined according to the format described in standard E.164 of the ITU (International Telecommunication Union) of a couple sharing the residential gateway in one and the same residence or the MSISDN number of the customer and that of the fixed line of the residence. According to one embodiment, one and the same contact address is associated with the management of several gateways. Indeed, certain customers may delegate the management of their gateway to other people. Such is typically the case for parents who delegate the management of their gateway to one of their children who may moreover have subscribed to his own gateway's management service.

According to other embodiments, the contact address can be an SIP (Session Initiation Protocol) recording address AoR (Address of Record), a URI (Uniform Resource Identifier) resource identifier.

The configuration of the filtering template consists in configuring filters for the sending of one or more notifications when the stream corresponds to one of the configured filters. These filters therefore correspond to streams/events which are a priori suspicious with respect to the habits of use of the gateway by the customer.

According to one embodiment, USSD (Unstructured Supplementary Service Data) technology is used for the configuration of the filtering template and of instructions governing the service for the sending of a notification. USSD technology has the advantage of circumventing direct connection to the gateway. The service provider can deploy a captive portal to configure alerts. This portal may be accessible from the user account's home page protected typically by a username and a password, or from a management interface local to the CPE. A user account may be for example a web portal where a user can access the management of the services subscribed to or offered by his provider. The configuration of the notification filters can follow a suggested default mode (i.e. the filtering rules are recommended and defined in advance by the operator), a personalized mode (that is to say the rules are defined by the customer himself) or a hybrid mode which combines the two previous modes. The configuration can propose choices regarding the way in which the notifications are sent to a contact identifier: in an immediate manner, by grouping several notifications relating to one and the same event, in a summary or detailed manner, etc. This preference is taken into account to generate the prompts to the customer when an incident has been observed. The filters can be activated in the gateway, or in one or more elements of the network.

The following events, the list of which is not exhaustive, can thus form the subject of the configuration of a filter:
- updating of the software (firmware) of the gateway,
- modification of DNS server(s),
- modification of dynDNS (Dynamic DNS) server(s),
- modification of an NTP (Network Time Protocol) server,
- activation of an FTP (File Transfer Protocol) server,
- modification (addition/deletion) of rule of the firewall of the gateway,
- attachment of a new terminal to the gateway,
- traffic not compliant with a normal profile: a machine which sends UDP traffic to a port which is known to be suspicious ("0", "443", etc.),
- connections to the gateway from the Internet.

The detection locally by the gateway or remotely by the network of one or more of these events triggers a notification destined for a contact address.

According to one mode of implementation, the notification is done by means of an SMS prompt message illustrated by FIG. 5. According to a first embodiment, the gateway CPE is connected to the mobile network. The detection of an event Event triggers the sending of the SMS message, via the radio connection, to the contact address of the customer CLI. The transfer path of the prompt message and that used to communicate the customer's decision can be symmetric or asymmetric. The gateway is in charge of the following tasks:
- activation/deactivation and configuration of the notification sending filters,
- taking a decision when a notification must be sent to a contact address,
- validation of the instructions received from the customer,
- execution of the actions received.

According to another embodiment illustrated by FIG. 6, the gateway CPE interfaces with one or more server(s) located in the network NW which host the functions of the ECIMP entity. When the gateway detects an abnormal stream Event, the ECIMP entity is responsible for relaying notifications NOTIF originating from the gateway by transmitting messages SMS NOTIF via SMS. The ECIMP entity is also responsible for relaying decisions SMS DECI received via SMS to the gateway in the form of messages POLICY so that the gateway can execute corrective actions. On receipt of the SMS return DECI from the customer, the ECIMP entity can send a confirmation message to the customer (ACK). In parallel, the ECIMP entity can execute actions (for example, modify rules for filtering in a network firewall) locally, in one or more elements of the network, and/or generate commands to the gateway CPE with the aid of the primitive POLICY.

The ECIMP functions are embedded in nodes of the network. It is simplest is to embed these ECIMP functions in the equipment for access to the IP network closest to the gateway such as a BRAS (Broadband Remote Access Server) in the case of ADSL connections or such as an OLT (Optical Line Termination) in the case of FFTH connections. The gateway is responsible for the following tasks:
- configuration and activation of notification sending filters,
- taking a decision when a notification must be sent to the ECIMP entity (this entails the decision to send a notification to ECIMP. This decision is taken by the CPE according to the event observed and which corresponds to one of the rules configured in the filtering template),
- validation and execution of the actions requested by the ECIMP entity (this entails for example the explicit or non-explicit acknowledgment (e.g. "block") of the receipt of the instruction or instructions conveyed in the message POLICY transmitted by the ECIMP entity and then of the execution of this or these instructions).

The ECIMP entity is responsible for the following tasks:
- activation and configuration of notification sending filters,
- taking a decision when a notification must be sent to a contact address,
- validation of the instructions received from the customer (for example, check that the instruction received from the customer has been proposed in a list of choices sent to the customer beforehand),
- execution of the actions received and relaying of certain of these actions to the gateway.

Certain filters defined by the user may be executed by the gateway itself. Certain filters may be executed by the ECIMP entity but this entity may also interact with other elements of the operator's network to set up these filters. For example, the ECIMP entity can use the resources of the NETCONF (Network Configuration Protocol), IPFIX (IP Flow Information Export), SYSLOG, or SNMP (Simple Network Management Protocol) protocols, for the configuration of certain filters or the receipt of notifications.

According to one embodiment illustrated by FIG. 7, the abnormal stream Event is detected by a filter configured in a server of the network NW which hosts one or more functions of the ECIMP entity. In this case, the ECIMP entity notifies the customer by means of a message SMS NOTIF via SMS. It optionally relays to the gateway the decisions SMS DECI received via SMS in the form of messages POLICY so that the gateway can execute certain corrective actions. The gateway is therefore adapted to receive messages POLICY in the absence of detection by itself of a suspicious stream.

The decision to send a notification to a contact address is taken by the ECIMP entity on the basis of the notifications received from the gateway and optionally of notifications received from nodes of the network which intervene in the filtering according to the determined template. The notifications sent by the gateway to the ECIMP entity do not result systematically in the sending of notifications via SMS messages to the customer's contact address. This decision is the responsibility of the ECIMP entity. Typically, the ECIMP entity can decide whether the notification received is "normal" (for example, corresponds to a software update of the gateway driven by the access provider) and can decide whether actions on the network side are sufficient to resolve the detected incident. The aim of this selective intelligence is to not overload the customer with unnecessary notifications. The granularity level of the notifications may be defined by each service provider or optionally by the customer himself.

According to one embodiment, the notification is structured as follows: {Event, [Associated risks], Action requested=Yes/No, Action=Confirm/Deny/Block/Permit/ . . . ,}. In addition to the event which is the subject of the notification and proposals of actions, the notification message may optionally include the security risks related to the event as well as other information.

Notification can be carried out by sending one or more SMS messages. Typically, for a given incident, a dedicated SMS message can describe the risks related to this incident while a distinct SMS message can be sent to invite the customer to take a decision.

When several contact addresses have been configured, the method can contact the customer sequentially or simultaneously by using these addresses.

According to an example illustrated by FIG. 8, the ECIMP entity notifies by means of a message SMS NOTIF a first address AoC_1. If no decision has been received from this address after a certain, optionally configurable, time, the notification message is sent to another contact address AoC_2. The ECIMP entity repeats this procedure until a response is received from one of the contact addresses on the list or if a maximum number of sending of notification messages has been attained. If no response has been received, the ECIMP entity may optionally take a decision to the benefit of the customer and account to him for the result of the application of this decision. For example, the detection of ICMPv6 (Internet Control Message Protocol, version 6) messages sent out on any port number between 5 and 99 and received on the hookup interface connecting the gateway to the network must rapidly lead the ECIMP entity to verify that the firewall installed in the gateway is correctly configured to filter these messages or to update the configuration of the firewall so that it filters these messages with the least possible delay.

According to an example illustrated by FIG. 9, the ECIMP entity simultaneously notifies several contact addresses AoC_1, AoC_2 on the list of configured addresses.

In case of conflict between the decisions communicated from various contact addresses, the ECIMP entity selects the decision to be taken into account according to a defined logic. For example, the ECIMP entity adopts the decision communicated by the number having a high priority according to an order of preference already advised by the customer. Alternatively, the ECIMP entity adopts the first decision in the order of receipt of the responses. Irrespective of the decision logic adopted by the ECIMP entity, a notification message SMS (ACK, DECI, etc.) containing the decision adopted by the ECIMP entity is sent to all the addresses that have responded to the prompt. The customer can delegate the decision taking to the service operator. In this case, the ECIMP entity decides on suitable actions according to the incident observed.

According to an example illustrated by FIG. 10, a key must be used to secure the exchanges. The notification message includes a unique key RANDOM_ID which must be returned in the response. This key must be generated in a random manner by the ECIMP entity. Note that the key can also be generated by the gateway CPE. The response received from the customer must include the key communicated in the corresponding prompt message;

the response is ignored in the converse case. The example of FIG. 10 illustrates the flow when the response received from the contact address AoC contains a valid key. A decision is then relayed to the gateway CPE for the execution of one or more suitable actions.

In the case where an erroneous key (including the absence of a key) is returned by the contact address AoC then a notification message is returned by the ECIMP entity to the contact address AoC. No decision is relayed to the gateway CPE as long as a valid key is not received from the contact address AoC.

The asynchronous nature of the sending of SMS messages may be inappropriate in case of emergency, for example when significant traffic received by the gateway suggests a service denial attack.

According to an embodiment which is appropriate in case of emergency, the ECIMP entity decides to establish a media communication (e.g., voice, video, that is to say real-time) with the customer in synchronous mode in an automatic manner. By way of example illustrated by FIG. 11, the ECIMP entity (or a dedicated media server) initializes a VoLTE session to a contact address of the customer. Once communication has been established, the notification is synthesized in audio. The customer is thereafter invited to communicate his decision according to the same audio medium or according to another medium (DMTF, etc.)

The residential gateway which receives a message POLICY undertakes the execution of the corresponding actions. An execution report in respect of these actions may optionally be sent to the ECIMP entity. A message POLICY can include one or more actions to be performed. One or more messages POLICY can be sent to order the gateway to execute several actions. Thus, the message POLICY can be used to communicate new notification filters to the gateway, to delete or to modify existing filters, etc.

An example of detecting an event that may correspond to an attempted diversion of the streams of a customer by an attacker is illustrated by FIG. 12. When the gateway CPE detects the modification of the configuration information in respect of a DNS server (even from a management interface of the gateway represented with dashed lines), it notifies NOTIF the ECIMP entity so as to inform it. The ECIMP entity thereafter notifies the customer CLI via a message SMS (DNS CHANGE) indicating to him that his DNS server has been changed. The message details if relevant the associated security risks. If this modification does not originate from the customer, he responds with an instruction SMS (DISCARD) to ask the ECIMP entity to cancel this modification of the DNS server configuration information. A message POLICY is thereafter sent by the ECIMP entity to ask the gateway CPE to update its DNS configuration. The message POLICY (DISCARD) includes the information necessary for executing the action by the gateway. By virtue of this procedure, this customer's traffic is not diverted by an attacker.

An example of attempted intrusion from a terminal is illustrated by FIG. 13. When the gateway CPE detects attachment or attempted attachment to the local network of the customer of a new terminal H1, the gateway notifies NOTIF the ECIMP entity to inform it. The ECIMP entity thereafter notifies the customer CLI via a message SMS (New Host Attachment) indicating to him that a terminal H1 has connected to his gateway CPE. The message SMS (New Host Attachment) details if relevant the associated security risks. If the customer CLI does not wish to authorize this attachment, he responds with an instruction SMS (Reject) asking the ECIMP entity to block or to refuse network access to this terminal H1. A message POLICY (Reject H1) is thereafter sent by the ECIMP entity to the gateway CPE to ask it to terminate this network connection. The message POLICY (Reject H1) includes the information necessary for executing the action by the gateway CPE (for example, the MAC (Medium Access Control) address of H1). By virtue of this procedure, only the terminals entitled to connect to the gateway CPE are authorized.

The customer can activate/deactivate the control method (or suspend it) at any moment (ON/OFF). When the method is suspended, the notification messages are no longer sent to any of the contact addresses although the filtering may be active. Access to the activation/deactivation function must be reliable to avoid fraudulent use of the procedure by an attacker. According to an exemplary implementation this function is made secure by administrative considerations (password).

Furthermore, the customer can add or delete a new contact address at any moment.

FIG. 14 illustrates the simplified structure of a residential gateway CPE implementing a method of dynamic and interactive control of the gateway according to one of the embodiments described hereinabove.

The gateway CPE according to one embodiment of the invention comprises a memory MEM comprising for example a buffer memory (RAM), a processing unit µP equipped for example with a processor and driven by a computer program Pg implementing the method of dynamic and interactive control of the gateway.

On initialization, the code instructions of the computer program Pg are for example loaded into the buffer memory (RAM) before being executed by the processor of the processing unit µP. The microprocessor of the processing unit µP implements the steps of the method of dynamic and interactive control of the gateway according to the instructions of the computer program Pg so as to execute by the processing unit µP a corrective action in respect of the configuration of the gateway.

To this end, the gateway further comprises configurable filters FIL, means EM/RE for sending a notification NOTIF and means EM/RE for receiving an action message POLICY.

These means are driven by the microprocessor of the processing unit µp.

Although the present disclosure has been described with reference to one or more examples, workers skilled in the art will recognize that changes may be made in form and detail without departing from the scope of the disclosure and/or the appended claims.

The invention claimed is:

1. A method of dynamic and interactive control of a residential gateway, which interfaces a user's local network, to a communication network, a user account of user being associated with the gateway and comprising a list of contact addresses declared by the user of the account comprising at least one contact address, wherein the method comprises:

filtering incoming and outgoing streams entering and exiting the residential gateway respectively from and to the communication network so as to detect a stream compliant with a filtering template configured with a list of suspicious events;

in case of detecting a stream compliant with the filtering template, triggering a sending of at least one notification to the at least one contact address; and conditionally upon reception of a decision sent from the at least one contact address subsequent to the sending of the notification, executing a corrective measure in respect of a configuration of the residential gateway to prevent a priori suspicious use of the gateway.

2. The method of dynamic and interactive control as claimed in claim 1, comprising executing the corrective measure after a determined time from sending the notification.

3. The method of dynamic and interactive control as claimed in claim 1, further comprising:

activating or deactivating the sending of the notification under control of an input of an authenticated user.

4. The method of dynamic and interactive control as claimed in claim 1, according to which configuration of the filtering and the sending of the notifications are implemented with real-time commands.

5. The method of dynamic and interactive control as claimed in claim 1, according to which the sending of a notification is performed with one or more so-called SMS or MMS short messages.

6. A system comprising:

a communication network;

a user's local network; and a residential gateway connected to the communication network for dynamic and interactive control of the gateway, a user account of the user being associated with the gateway and comprising a list of contact addresses declared by the user of the account comprising at least one contact address, wherein the gateway interfaces the user's local network to the communication network, wherein:

the gateway comprises filters configured according to a filtering template configured with a list of suspicious events to filter incoming and outgoing streams entering and exiting the residential gateway respectively from and to the communication network, and, in case of the filters detecting a stream compliant with the filtering template, the gateway is adapted to trigger a sending of a notification to the at least one contact address and conditionally upon reception of a decision sent from the at least one contact address subsequent to the transmission of the notification, executing a corrective measure in respect of a configuration of the residential gateway to prevent a priori suspicious use of the gateway.

7. A communication system for dynamic and interactive control of a residential gateway, the system comprising:

a communication network comprising a server, the residential gateway being connected to the network, a user account being associated with the gateway and comprising a list of contact addresses declared by a user of the user account comprising at least one contact address, and wherein:

the server comprises filters configured according to a filtering template configured with a list of suspicious events to filter incoming and outgoing streams entering and exiting the residential gateway, and, in case of the filters detecting a stream compliant with the filtering template, the server is adapted to trigger the sending of a first notification to the at least one contact address and conditionally upon reception of a decision sent from the at least one contact address subsequent to the transmission of the first notification, ordering a corrective measure intended to modify the configuration of the residential gateway to prevent a priori suspicious use of the gateway.

8. A residential gateway configured to be connected to a communication network comprising a server and configured to interface a user's local network with the communication network, a user account of the user being associated with the gateway and comprising a list of contact addresses declared by the user of the user account comprising at least one contact address, wherein the residential gateway comprises:
   a processor; and
   a non-transitory computer-readable medium comprising instructions stored thereon which when executed by the processor configure the residential gateway to:
   filter with a filtering template configured with a list of suspicious events incoming streams and outgoing streams entering and exiting the gateway respectively from and to the communication network,
   send a notification to the server for relaying to the at least one contact address if at least one stream is compliant with the filtering template,
   receive from the server an action message describing at least one corrective action to be executed by said residential gateway conditionally upon the reception by the server of a decision sent from the at least one contact address subsequent to the sending of the notification, and
   execute the corrective action to prevent a priori suspicious use of the gateway.

9. A method of dynamic and interactive control of a residential gateway, which interfaces a user's local network, to a communication network, a user account of the user being associated with the gateway and comprising a list of addresses declared by the user of the account, wherein the method comprises:
   filtering incoming and outgoing streams entering and exiting the residential gateway respectively from and to the communication network so as to detect a stream compliant with a filtering template configured with a list of suspicious events;
   in case of detecting a stream compliant with the filtering template, triggering a sending of at least one notification to several contact addresses which are part of the list of declared addresses; and
   conditionally upon reception of a decision sent from at least one of the several contact addresses subsequent to the sending of the notification, executing a corrective measure in respect of a configuration of the residential gateway to prevent a priori suspicious use of the gateway.

10. A residential gateway configured to be connected to a communication network comprising a server and configured to interface a user's local network with the communication network, a of the user account being associated with the gateway and comprising a list of contact addresses declared by the user of the user account, wherein the residential gateway comprises:
   a processor; and
   a non-transitory computer-readable medium comprising instructions stored thereon which when executed by the processor configure the residential gateway to:
   filter with a filtering template configured with a list of suspicious events incoming streams and outgoing streams entering and exiting the gateway respectively from and to the communication network,
   in case of at least one stream being compliant with the filtering template, send a notification to the server for relaying to several contact address of the list,
   receive from the server an action message describing at least one corrective action to be executed by said residential gateway conditionally upon reception by the server of a decision sent from at least one of the several contact addresses subsequent to the sending of the notification, and
   execute the corrective action to prevent a priori suspicious use of the gateway.

\* \* \* \* \*